United States Patent [19]

Engel et al.

[11] 4,024,891
[45] May 24, 1977

[54] CONTROL VALVE WITH NOISE ABATING FEATURES

[75] Inventors: Hans Engel, Hanau; Eberhard Sorger, Muehlheim, both of Germany

[73] Assignee: Honeywell Inc., Minneapolis, Minn.

[22] Filed: June 23, 1975

[21] Appl. No.: 589,788

[30] Foreign Application Priority Data

Apr. 18, 1975 Germany .......................... 2431322

[52] U.S. Cl. ...................... 137/625.3; 137/625.38; 138/42; 138/43
[51] Int. Cl.² ...................... F16K 1/54; F16K 47/04
[58] Field of Search ................ 137/625.38, 625.39, 137/625.35, 625.3; 138/43, 42; 251/118

[56] References Cited

UNITED STATES PATENTS

| | | | |
|---|---|---|---|
| 1,108,950 | 9/1914 | Viger | 137/625.38 |
| 2,918,087 | 12/1959 | Curran | 137/625.35 X |
| 3,665,965 | 5/1972 | Baumann | 138/42 |

FOREIGN PATENTS OR APPLICATIONS

| | | | |
|---|---|---|---|
| 1,175,501 | 8/1964 | Germany | 138/42 |

*Primary Examiner*—Arnold Rosenthal
*Attorney, Agent, or Firm*—Laurence J. Marhoefer; Lockwood D. Burton; George E. Bodenstein

[57] ABSTRACT

A noise abating plug for a fluid control valve includes a perforated sleeve that forms one end portion of the plug and a plurality of spaced apart perforated discs that extend between a hub portion of the plug and the inner wall of the sleeve portion. The perforations in the sleeve and in the multi-perforated discs form a varying number of restrictive passageways for the fluid under control as the plug is moved between its open and closed positions and thereby maintain the pressure reduction occurring at the perforated sleeve and perforated discs at values which minimize the noise created by the fluid as it flows through the valve.

7 Claims, 6 Drawing Figures

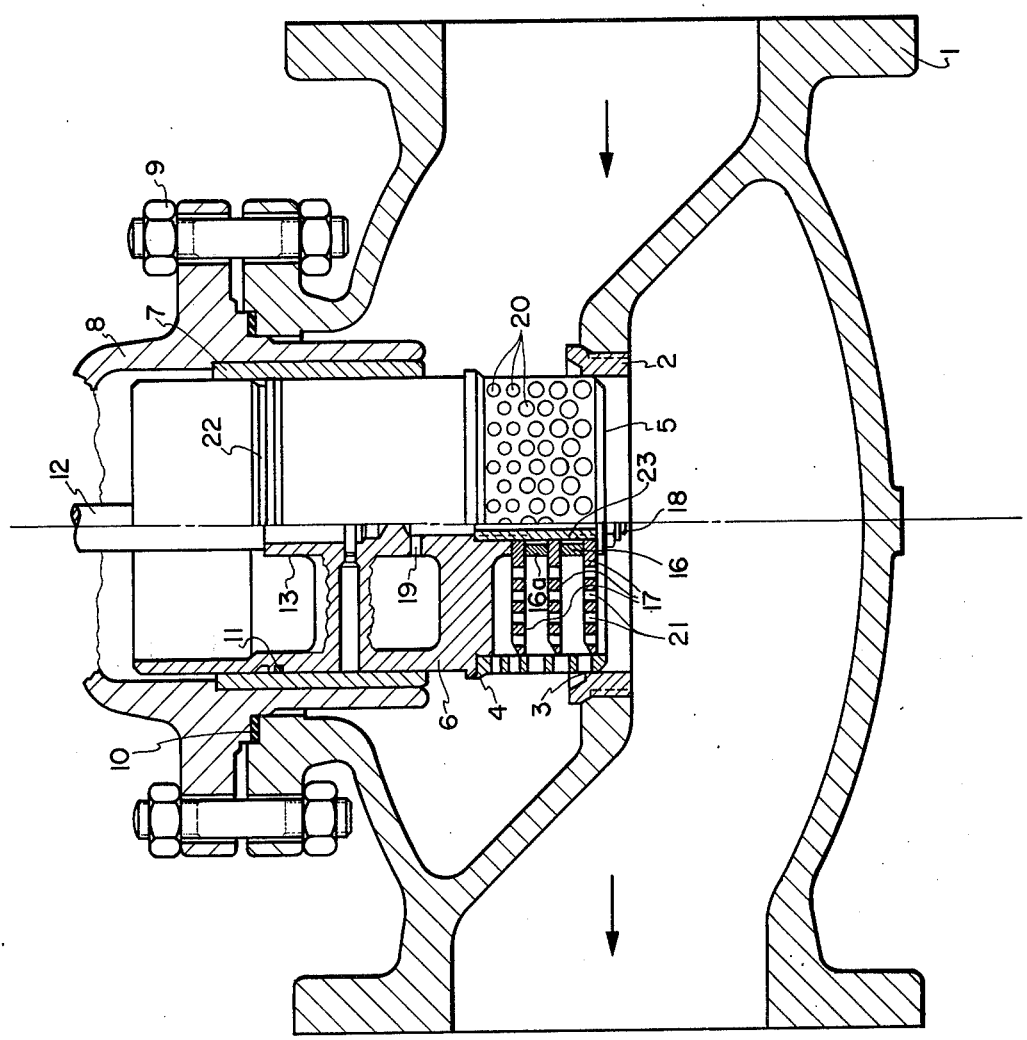
FIG. I

CONTROL VALVE WITH NOISE ABATING FEATURES

1. BACKGROUND OF THE INVENTION

The invention relates to fluid control valves and more particularly to a noise abating valve assembly.

2. DESCRIPTION OF THE PRIOR ART

There has been shown, in the prior art, a single stage valve structure which features a perforated sleeve as a throttling member to introduce an intensive friction loss and reduce the pressure of a flowing fluid passing through the valve. This action is employed to reduce the possibility of a noise producing cavition effect and the effect of an over critical velocity flow from occurring. Such a valve structure is shown and described on Pages 141 to 144 of the Instruments And Control Systems Magazine, Volume 42 No. 9, dated September 1969. It is known that when use is made of such single stage valves that employ steam and gases as the fluid under control that the input pressure of such fluids can in the best case be reduced to only half of its value before a velocity of sound can occur that introduces noise at an undesirable sound level.

Furthermore, such a pressure reduction is only possible without noise emission if the intensive friction loss of the fluid is obtained and the so-called pressure recovery of the valve remains at a minimum value.

Another prior art type of low noise control valve that has been used is disclosed in the German Patent No. 1,008,977. This valve employs a fixed throttle in the form of a restricted passageway connected in series with the valve. This fixed throttle generates a pressure drop increasing in a square-law dependence on the rate of flow. When the rate of flow is constant, or if the conditions show only minor changes, it is possible to match the fixed restrictor to the actual conditions. If however, the range of regulation of the valve becomes three to one or greater, then it becomes impossible to obtain a satisfactory reduction of noise with the use of such restrictors. Another undesirable factor encountered in the use of this valve is that its fixed throttle leads to a strong degressive valve characteristic.

The aforementioned disadvantages of fixed throttles may be prevented by making use of valves that have several stages. However, valves with several stages have heretofore rarely been used because of their high prices, complicated manufacturing and problems of tolerances associated with such valves.

SUMMARY OF THE INVENTION

It is an object of the present invention to provide an improved construction for a control valve which will reduce the noise generated over that generated by prior art valve constructions.

It is another object of the invention to provide a unitary valve that combines the advantages of a several-stage valve with the advantages of a fixed throttle type valve.

It is another object to provide a modified form of the inventon in which each of the perforated discs is constructed of two identical perforated plates whose flat faces can purposely be angularly displaced from one another so that the parts of one plate are positioned to cover parts of each of the perforations in the other plate.

It is an object of the invention to provide another modified form of the invention in which the discs are separated from one another by bushings that are of different lengths whereby an increasing volume between the preforated discs in the direction of flow is assured, to accommodate the increased volume of gas or steam flow resulting from the pressure drop produced.

In accomplishing these and other objects, there has been provided a plug for a fluid control valve that has a perforated sleeve and a series of spaced apart perforated discs poritioned on a hub portion of the plug that extend in an outward direction to a position adjacent the inner wall of the sleeve.

As the plug is moved to any position between a fully opened and a fully closed position, the pressurized fluid passing through the body of the valve will be forced through the perforations in the sleeve and discs. Since a varying number of perforations in the sleeve and discs is exposed as the plug is moved between its open and closed positions in the valve body, this type of sleeve and disc construction will thereby allow the pressure drop occurring across the perforated sleeve to remain substantially equal to drop across each disc for every position of the plug and thereby reduce undesired noise emission from occurring when the plug is in any one of these positions.

A better understanding of the invention may be had from the following detailed description when read in connection with the accompanying drawing in which:

FIG. 1 is a longitudinal cross section through a first embodiment of a control valve according to the invention;

FIG. 2a is a plan view of a perforated disc arrangement employed in FIG. 1;

FIG. 2b is a cross section taken along the lines II—II through the preforated disc arrangement shown in FIG. 2a;

FIG. 3a is a plan view of the perforated disc arrangement of FIG. 2a with one of the plates in a different angular position;

FIG. 3b is a cross section taken along the lines III—III of the perforated disc arrangement shown in FIG. 3a.

DESCRIPTION OF THE PREFERRED EMBODIMENT

Figures 2A, 2B:
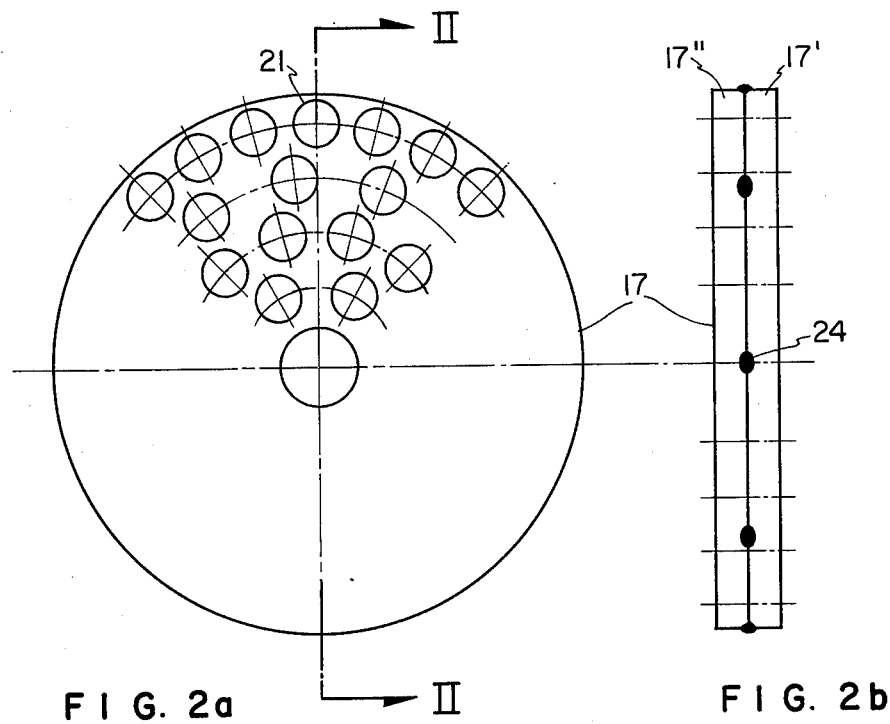
Figures 3A, 3B:
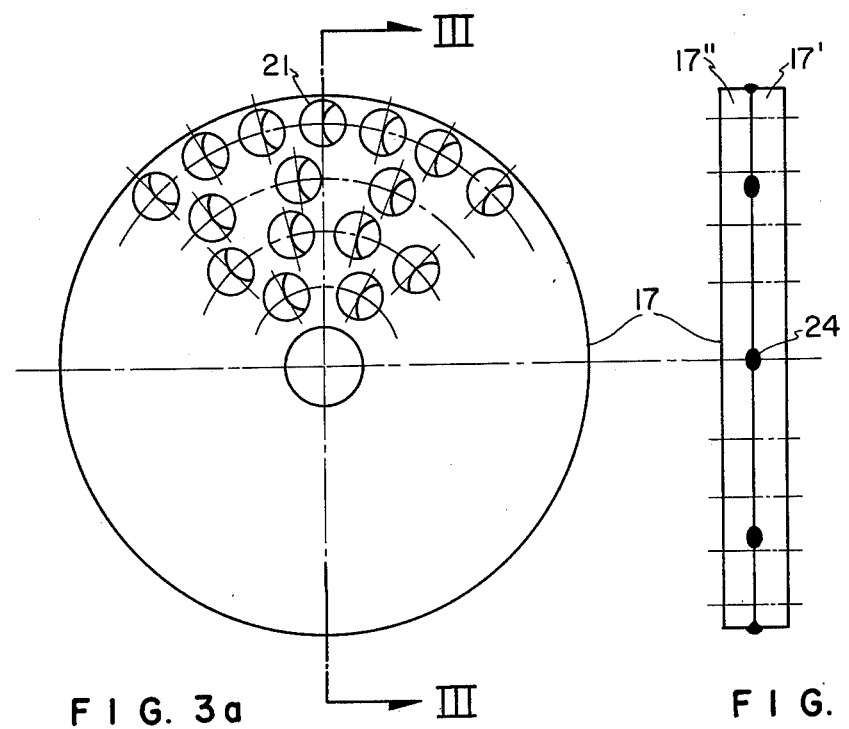

For an understanding of the preferred embodiment of the invention, reference will be first made to FIG. 1.

The noise abating valve construction in accordance with the present invention includes a valve seat ring 2, screwed into a valve housing 1 and having a beveled valve seat 3. A second associated valve seat 4 is formed on a throttling plug member 5. The throttling plug member 5 has a perforated sleeve 6 that is of an H-shaped cross section slidably mounted at one end in the valve seat ring 2, and its other end is mounted for slidable movement in a guide bearing 7. The guide bearing 7 is inserted in an upper housing part 8 of the valve housing 1. The upper valve housing part 8 is fixed by a plurality of screw and nut connections 9 and an associated gasket 10 to the valve housing 1.

A piston ring 11 is mounted in a peripheral groove 22 in the upper part of the perforated sleeve 6 and is in fluid tight slidable engagement with the inner wall of the guide bearing 7. A valve rod 12 is connected for joint movement with the throttling plug member 5. The upper end of valve rod 12 is guided in a bearing, not shown, that is located in the upper part of the valve housing part 8. The upper end of the valve rod 12 is also surrounded by packing, not shown. The perforated sleeve 6 has a hub portion 13 thereof that is in abutting relationship against a shoulder formed on the rod 12.

A plurality of perforated discs 17 is positioned inside of the perforated sleeve 6. The perforated discs 17 are spaced apart from one another by bushings 16, 16a. The lower space bushing 16 is somewhat longer than the second space bushing 16a. The perforated discs 17 and the space bushings 16, 16a are mounted on a hollow threaded rod 23. The upper end portion of the threaded rod 23 is screwed into a central portion of the perforated sleeve 6. A nut 18 that is mounted on the lower end of the threaded rod 23 is shown retaining the discs 17 and their associated bushings 16, 16a in pressed together relationship with one another. The bore in the threaded rod 23 together with a bore 19 in the hub of the perforated sleeve 6 provide a passageway between the bottom and top portions of the throttling plug 5. The apertures 20 in the perforated sleeve 6 beneath the bevel of valve seat 4 of the throttling plug member 5 have a diameter which is increasing with increasing distance from the bevel of the valve seat 4. Similarly, the cross section of the apertures 21 in the perforated discs 17 increases from disc to disc in the direction of the flow of the fluid as indicated by the arrows.

FIGS. 2a to 3b inclusive show how a different cross section of an aperture 21 in each perforated discs 17 may be varied between a minimum and a maximum size opening by rotating two identical perforated discs 17' and 17" relative to each other. After adjusting the size of the aperture both perforated discs 17' and 17" are shown secured against relative rotation with respect to one another by spot welding material 24.

Figure 4:
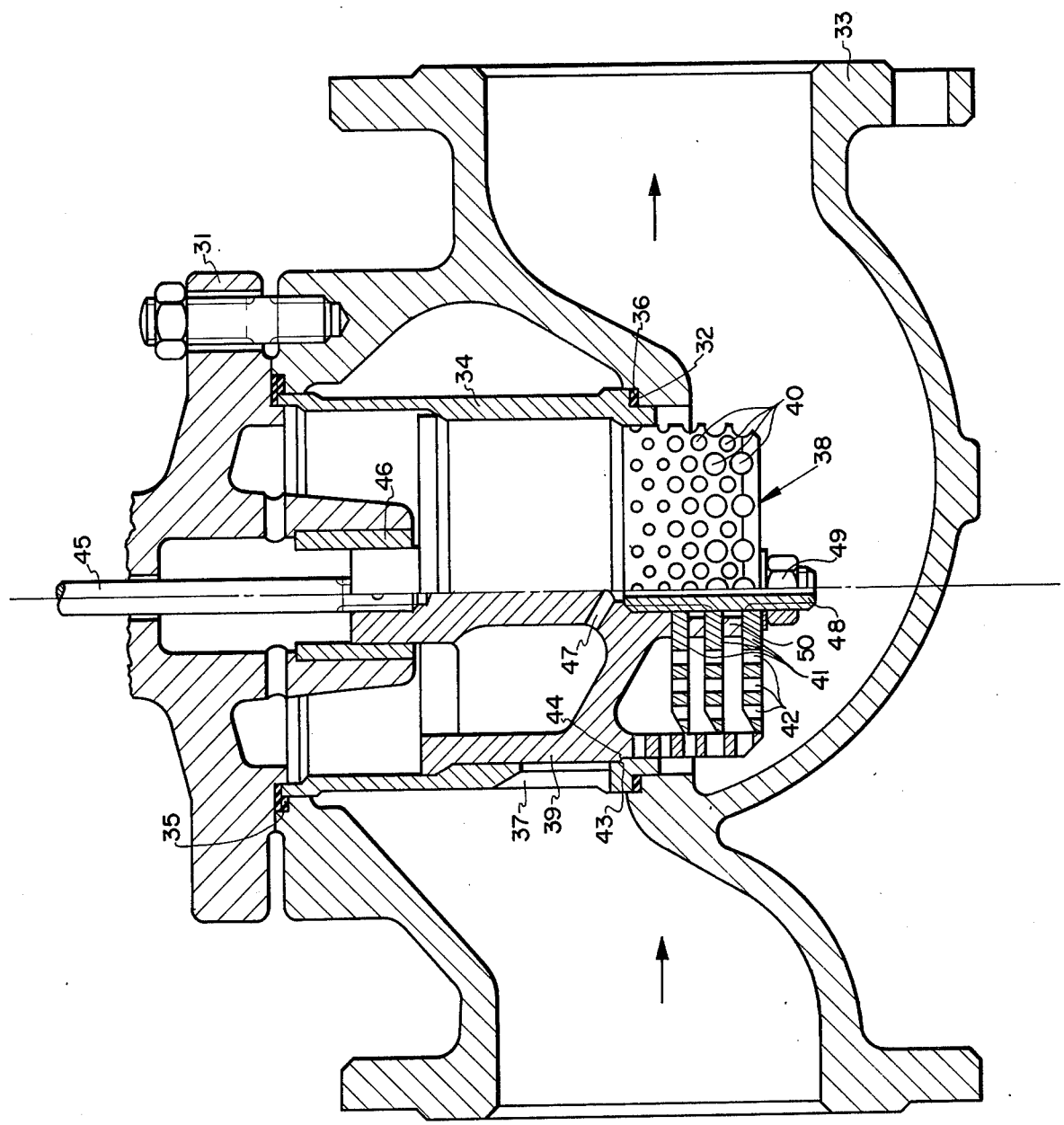
FIG. 4 is a longitudinal cross section through a second embodiment of the control valve showing how our invention is applied thereto.

FIG. 4 shows a control valve that is in the form of a cage valve having a body 33. This cage valve has a sleeve shaped cage 34 clamped between a ring shoulder 32 and an upper part 31 of the valve housing. Gasket rings 35 and 36 are respectively employed as fluid tight seals between the upper end surfaces of the sleeve shaped cage 34 and the upper part 31 of the valve housing, and between the ring shoulder 32 and the lower end of the sleeve shaped cage 34. The cage 34 comprises a number of windows 37 which number is related to the nominal free diameter of the valve. A throttling plug member 38 is disposed for displacement along the inner wall of cage 34. The throttling member 38 is constructed in a manner similar to the plug 5 previously set forth under the description of FIG. 1. The plug 38 of FIG. 4 has a perforated sleeve 39 and a plurality of apertures 40 that extend through the sleeve 39. Perforated discs 41 are arranged in spaced apart relationship from each other inside the perforated sleeve 39. The perforated discs 41 have apertures 42 of different sizes. The adjustment of the size of the aperture is arranged as previously set forth under the description of FIGS. 2a, to 3b.

An annular beveled valve seat 44 is formed on the throttling plug member 38, and the seat 44 seats against an annular beveled valve seat 43 formed on the lower end of the cage 34. The perforated sleeve 39 is connected for movement with a valve rod 45. A bearing insert 46 that is positioned in the upper part 31 of the valve housing and the lower part of the cage 34 provide stationary guides for the throttling plug member 38. The perforated discs 41 are spaced apart from each other by space bushings 50. A hollow threaded rod 48 is threadedly connected at its upper end to a hub portion of the perforated sleeve 39. The perforated discs 41 and the spaced apart bushings 50 are stacked on the hollow threaded rod 48 and pressed together by a nut 49 that is threadedly connected to the lower end of the rod 48. The hollow threaded rod 48 together with a bore 47 in the perforated sleeve 39 provide a passageway between the bottom and top portions of the throttling plug 38.

MODE OF OPERATION

By reference to FIG. 1 it can be seen that as fluid such as steam, a gas or a liquid under pressure flows in the direction of the arrow from the inlet to the outlet side of the valve housing or body 1, it will be required to flow through the apertures 20 in the sleeve 6 and through the apertures 21 in the discs 17.

The control valve according to the invention thus makes it possible to combine the advantages of a multistage valve with the advantages of a valve having a fixed throttle. The present invention relates to a two stage valve combined into a single unit whereby the first stage is effected by the throttling action taking place between the seat ring 2 and the perforated sleeve 6. This kind of throttling with regard to pressure recovery and noise emission is superior to all known embodiments such as parabolic plug, slotted plug etc.

The second controllable throttling area is effected by the position of the perforated discs 17 with respect to the controlling edge of the seat ring 2.

The number of perforated discs 17 that are used in any application will be dependent upon the length of the stroke through which the plug 5 is required to travel.

A further advantage derived from the valve of the present invention is that the perforated discs 17 are integrated in the throttling area. As compared with valve arrangements in which the throttling area is in series with the valve as shown in the prior art valve construction to which reference has been previously made, the present valve is thus given a higher effectiveness. Furthermore when peak valves of the velocity of fluid occur, controllable throttling areas and the fixed throttle employed in prior art valve constructions have heretofore had the tendency to produce non-desired shock waves and noise.

The present invention provides a perforated sleeve and perforated disc construction for the throttling plug of a valve that will prevent it from producing the undesired shock waves and noise that have heretofore been experienced by the previously mentioned prior art valves.

The embodiments of the invention in which an exclusive property or privilege is claimed are defined as follows:

1. A fluid control valve including a body having a fluid inlet passageway, a fluid outlet passageway, and a first seat means located between said passageways and defining with the latter a fluid flow path through said body, said valve also including a noise abating throttling plug arranged for movement along its axis and within said first seat means between closed and open positions, said plug comprising a second seat means which sealingly engages said first seat means to close said flow path when said plug occupies said closed position, a perforated throttling sleeve which moves axially within said first seat means, to open an increasing number of the perforations of said sleeve to said flow path, as said plug is moved from said closed position to said open position, and a plurality of perforated discs mounted within said sleeve in spaced relation along and substantially normal to the axis thereof, each of said discs extending completely throughout the cross-sectional area of said sleeve to cause the fluid passing through said sleeve perforations to pass through configurations of all of the perforations in said discs, which configurations vary as said plug is moved between said positions, whereby the fluid in said flow path passes through configurations of said sleeve and disc perforations which vary, as said plug is moved between said positions, to form varying restrictive fluid passageway combinations for the fluid in said flow path as necessary to corrrespondingly vary the fluid pressure drops effected along said flow path while minimizing the noise created by the passage of said fluid along said flow path.

2. The valve as defined in claim 1, wherein
said body contains a valve cage,
said first seat means is a portion of said cage, and
said plug moves axially in said cage.

3. A fluid control valve including a body having a fluid inlet passageway, a fluid outlet passageway, and a first seat means located between said passageways and defining with the latter a fluid flow path through said body, said valve also including a noise abating throttling plug arranged for movement along its axis and within said first seat means between closed and open positions, said plug comprising a second seat means which sealingly engages said first seat means to close said flow path when said plug occupies said closed position, a perforated throttling sleeve which moves axially within said first seat means, to open an increasing number of the perforations of said sleeve to said flow path, as said plug is moved from said closed position to said open position, and a plurality of perforated discs mounted within said sleeve in spaced relation along and substantially normal to the axis thereof, each of said discs extending completely throughout the cross-sectional area of said sleeve to cause the fluid passing through said sleeve perforations to pass through configurations of all of the perforations in said discs, which configurations vary as said plug is moved between said positions, the areas of said perforations in said discs increasing from disc to disc in the direction of the flow of the fluid along said flow path, whereby the fluid in said flow path passes through configurations of said sleeve and discs perforations which vary, as said plug is moved between said positions, to form varying restrictive fluid passageway combinations for the fluid in said flow path as necessary to correspondingly vary the fluid pressure drops effected along said flow path while minimizing the noise created by the passage of said fluid along said flow path.

4. The valve as defined in claim 3, wherein each of said discs consists of at least two perforated plates secured in face to face relationship with each other and initially relatively rotatable to establish the area of said perforations in that one of said discs.

5. A fluid control valve including a body having a fluid inlet passageway, a fluid outlet passageway, and a first seat means located between said passageways and defining with the latter a fluid flow path through said body, said valve also including a noise abating throttling plug arranged for movement along its axis and within said first seat means between closed and open positions, said plug comprising a second seat means which sealingly engages said first seat means to close said flow path when said plug occupies said closed position, a perforated throttling sleeve which moves axially within said first seat means, to open an increasing number of the perforations of said sleeve to said flow path, as said plug is moved from said closed position to said open position, and a plurality of perforated discs mounted within said sleeve in a spaced relation along and substantially normal to the axis thereof, the distance between adjacent ones of said discs increasing in the direction of the flow of the fluid along said flow path, each of said discs extending completely throughout the cross-sectional area of said sleeve to cause the fluid passing through said sleeve perforations to pass through configurations of all of the perforations in said discs, which configurations vary as said plug is moved between said positions, whereby the fluid in said flow path passes through configurations of said sleeve and disc perforations which vary, as said plug is moved between said positions, to form varying restrictive fluid passageway combinations for the fluid in said flow path as necessary to correspondingly vary the fluid pressure drops effected along said flow path while minimizing the noise created by the passage of said fluid along said flow path.

6. A fluid control valve including a body having a fluid inlet passageway, a fluid outlet passageway, and a first seat means located between said passageways and defining with the latter a fluid flow path through said body, said valve also including a noise abating throttling plug arranged for movement along its axis and within said first seat means between closed and open positions, said plug comprising a second seat means which sealingly engages said first seat means to close said flow path when said plug occupies said closed position, a perforated throttling sleeve which moves axially within said first seat means, to open an increasing number of the perforations of said sleeve to said flow path, as said plug is moved from said closed position to said open position, and a plurality of perforated discs mounted within said sleeve in spaced relation along and substantially normal to the axis thereof, the distance between adjacent ones of said discs increasing in the direction of the flow of the fluid along said flow path, each of said discs extending completely throughout the cross-sectional area of said sleeve to cause the fluid passing through said sleeve perforations to pass through configurations of all of the perforations in said discs, which configurations vary as said plug is moved between said positions, the area of said perforations in said discs increasing from disc to disc in the direction of the flow of the fluid along said flow path, whereby the fluid in said flow path passes through configurations of said sleeve and discs perforations which vary, as said plug is moved between said positions, to form varying restrictive fluid passageway combinations for the fluid in said flow path as necessary to correspondingly vary the fluid pressure drops effected along said flow path while minimizing the noise created by the passage of said fluid along said flow path.

7. The valve as defined in claim 6, wherein the areas of said sleeve perforations increase from one end of said sleeve to the other in a direction opposite to that in which said plug is moved from said closed position to said open position, whereby progressively larger ones of said sleeve perforations are opened to said flow path as said plug is progressively moved from said closed position to said open position.

* * * * *